(12) United States Patent
Hawinkels et al.

(10) Patent No.: US 11,499,606 B2
(45) Date of Patent: Nov. 15, 2022

(54) ROLLER FOR A CHAIN

(71) Applicant: DSM IP ASSETS B.V., Heerlen (NL)

(72) Inventors: Ruud Joseph Hubertus Hawinkels, Echt (NL); Bartholomeus Guillaume Bernardus Reijmers, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 330 days.

(21) Appl. No.: 16/954,796

(22) PCT Filed: Dec. 18, 2018

(86) PCT No.: PCT/EP2018/085528
§ 371 (c)(1),
(2) Date: Jun. 17, 2020

(87) PCT Pub. No.: WO2019/121703
PCT Pub. Date: Jun. 27, 2019

(65) Prior Publication Data
US 2021/0088110 A1    Mar. 25, 2021

(30) Foreign Application Priority Data

Dec. 21, 2017 (EP) .................................... 17209278

(51) Int. Cl.
*F16G 13/06* (2006.01)
(52) U.S. Cl.
CPC .................................... *F16G 13/06* (2013.01)
(58) Field of Classification Search
CPC ....................................................... F16G 13/06

(Continued)

(56) References Cited

U.S. PATENT DOCUMENTS 8,327,614 B1   12/2012  Tegeler et al.

FOREIGN PATENT DOCUMENTS

| CN | 203322159 | 12/2013 |
|---|---|---|
| CN | 205446554 | 8/2016 |

(Continued)

OTHER PUBLICATIONS

International Search Report for PCT/EP2018/085528, dated Mar. 14, 2019, 3 pages.

(Continued)

*Primary Examiner* — Gene O Crawford
*Assistant Examiner* — Emily Rose Kincaid
(74) *Attorney, Agent, or Firm* — Nixon & Vanderhye P.C.

(57) ABSTRACT

The invention relates to a roller for a chain which is constructed by a shell roller part and a core roller part, wherein the shell roller part comprises a first outer cylinder, a first inner cylinder which is positioned concentrically inside the first outer cylinder, and a bottom which is positioned at and connected to one end of the first inner cylinder and the first outer cylinder; and wherein the bottom is stretched from the first inner cylinder to the first outer cylinder; wherein the core roller part comprises a second outer cylinder, a second inner cylinder which is positioned concentrically inside the second outer cylinder, and a top which is positioned at and connected to one end of the second inner cylinder and the second outer cylinder; and wherein the top is stretched from the second inner cylinder to the second outer cylinder; wherein the core roller part is positioned concentrically in the space surrounded by the first inner cylinder, the first outer cylinder and the bottom.

14 Claims, 3 Drawing Sheets

(58) Field of Classification Search
USPC .......................................................... 474/231
See application file for complete search history.

(56) References Cited

FOREIGN PATENT DOCUMENTS

| | | |
|---|---|---|
| EP | 0 119 898 | 9/1984 |
| EP | 0119898 | 9/1984 |
| EP | 0404224 | 12/1990 |
| GB | 459104 | 6/1936 |
| KR | 10-2010-0086328 | 7/2010 |
| WO | 85/01783 | 4/1985 |

OTHER PUBLICATIONS

Written Opinion of the ISA for PCT/EP2018/085528, dated Mar. 14, 2019, 6 pages.

ROLLER FOR A CHAIN

This application is the U.S. national phase of International Application No. PCT/EP2018/085528 filed 18 Dec. 2018, which designated the U.S. and claims priority to EP Patent Application No. 17209278.5 filed 21 Dec. 2017, the entire contents of each of which are hereby incorporated by reference.

The present invention relates to a roller for a chain. It particularly relates to a roller with a core-shell structure constructed by assembling a shell roller part and a core roller part.

A roller chain is a type of drive chain that is most commonly used for transmission of mechanical power on many kinds of domestic, industrial and agriculture machinery, including conveyor belts, wire and tube drawing and pipe trimming machines, printing presses, and engines of cars, motorcycles, and bicycles. It consists of a series of short cylindrical rollers that are held together by side links, it is driven by a toothed wheel called a gear or a sprocket. It is a simple reliable and efficient means for power transmission.

There are actually two types of links alternating in the bush roller chain. The first type is that of inner links, having two inner plates held together by two sleeves upon which two rollers rotate. Inner links alternate with the second type, the outer links, consisting of two outer plates held together by pins passing through the bushing of the inner links. Generally, a chain includes inner plates, outer plates, bushing press-fitted into the inner plates, pins press-fitted into the outer plates and passed through the bushings and rollers which are located between the inner plates and through which the bushings are passed. A lubricant is applied at sliding portions between the pin and the bushing and between the bushing and the roller.

The design of the roller chain reduces friction and results in higher efficiency and less wear. However, the chain tends to wear due to the friction with the sprocket. As a result, it puts a high requirement for the material from which the roller made.

One object of present application is to provide a roller for a chain with a core-shell structure.

Another object of present application is to provide a chain unit and a chain using such core-shell structure roller.

The present invention provides a roller for a chain which is constructed by a shell roller part and a core roller part, wherein the shell roller part comprises a first outer cylinder, a first inner cylinder which is positioned concentrically inside the first outer cylinder, and a bottom which is positioned at and connected to one end of the first inner cylinder and the first outer cylinder; and wherein the bottom is stretched from the first inner cylinder to the first outer cylinder; wherein the core roller part comprises a second outer cylinder, a second inner cylinder which is positioned concentrically inside the second outer cylinder, and a top which is positioned at and connected to one end of the second inner cylinder and the second outer cylinder; and wherein the top is stretched from the second inner cylinder to the second outer cylinder; wherein the core roller part is positioned concentrically in the space surrounded by the first inner cylinder, the first outer cylinder and the bottom.

The roller according to the present invention is constructed of two parts, a shell roller part and a core roller part, each having an inner and an outer cylinder. The top and the bottom of the roller are positioned on at opposite sides of the roller. The bottom is an element of the shell roller part and extends from the first inner cylinder to the first outer cylinder. The top is an element of the core roller part and extends from the second inner cylinder to the second outer cylinder.

The space defined by and surrounded by the first inner cylinder, the first outer cylinder and the bottom of the core roller part in the roller according to the invention is closed off by the shell roller part, thus preventing dirt pick-up and accumulation.

The shell roller part and the core roller part could be fixed and secured by a snap, press fit, screwing or heat staking.

Preferably, the shell roller part and the core roller part are fixed by a snap.

In one preferred embodiment, the shell roller part comprises a snap device and the corresponding core roller part comprises a corresponding gap, for receiving and thereby accommodating the snap device; preferably, the snap is positioned on the inner cylinder of the shell roller part, and a corresponding gap for receiving the snap is positioned in the second inner cylinder of the core roller part. The gap for receiving the snap can be a slot or an opening.

By using the snap device, when the core roller part is being pressed into the shell roller part, the snap deforms elastically until the core roller part is in final position; at this moment, the gap lets the snap to 'snap back' or click back to its original shape. When the roller is assembled to or mounted on a bushing, there's no longer room for the snap to disengage. Preferably, there are more than one snaps evenly distributed and positioned on the first inner cylinder, more preferably there are two snaps evenly distributed and positioned on the first inner cylinder of the shell roller part.

In another preferred embodiment, the core roller part comprises a snap and the corresponding shell roller part comprises a corresponding gap or opening for receiving the snap device. Preferably, the snap is positioned on the second inner cylinder of the core roller part, and corresponding gap is positioned in the first inner cylinder of the shell roller part. When the core roller part is pressed into the shell part, the snap deforms elastically until the core roller part is in its final position, at this moment, the gap allows the snap to 'snap back' to its original shape.

In another preferred embodiment, the core roller part further comprises ribs which are radially evenly distributed in the space between the second inner cylinder and the second outer cylinder and extend from the second inner cylinder to the second outer cylinder.

In a further preferred embodiment, the core roller part has 6 to 12 ribs, preferably 8 ribs. The ribs are evenly distributed between the second inner cylinder and the second outer cylinder of the core roller part and radiated from the second inner cylinder to the second outer cylinder. Preferably, the ribs have the same height with the second inner cylinder and the second outer cylinder. In a preferred embodiment, the thickness of the ribs is the same as the thickness of the second outer cylinder and/or the second inner cylinder.

In another preferred embodiment, the thickness of the second outer cylinder and/or the second inner cylinder is slightly larger than that of the first outer cylinder and/or the first inner cylinder.

In a further preferred embodiment, the first inner cylinder, the first outer cylinder, the second inner cylinder, the second outer cylinder, the bottom of the shell roller part, the top of the core roller part and ribs of the core roller part have the same thickness. The maximum thicknesses of the first inner cylinder, the first outer cylinder, the second inner cylinder, the second outer inner cylinder, the bottom of the shell roller part, the top of the core roller part and ribs or the core roller part are less than 4 mm, preferably, less than 3 mm, more preferably, less than 2 mm. Therefore, the maximum wall thickness of the first outer cylinder and the second outer cylinder can be up to 8 mm which result in the reduction of the stress. According to the test result, the stress resulting from this design is reduced by a factor of 2.

In a preferred embodiment, both the shell roller part and the core roller part are made of and manufactured from a plastic material. The shell roller part and the core roller part are made of the same plastic material or different plastic materials.

In another preferred embodiment, the plastic material comprises a base polymer selected from the group consisting of polyamides, polyesters, polyphenylene sulfides (PPS) and/or polyphenylene-ethers (PPE).

In one preferred embodiment, the base polymer comprises an aliphatic polyamide or a semi-aromatic polyamide or a blend thereof; suitably the aliphatic polyamide comprises one or more polyamides selected from the group consisting of polyamide-6, polyamide-46, polyamide-56, polyamide-66, polyamide-410, polyamide-510, polyamide-610, and co-polyamides thereof. Suitably the semi-aromatic polyamide comprises one or more semi-crystalline polyamides selected from the group consisting of

- homopolyamides polyamide-7T, polyamide-8T, polyamide-9T, polyamide-10T and polyamide-12T;
- copolyamides of two or more of polyamide-4T, polyamide-5T, polyamide-6T, polyamide-7T, polyamide-8T, polyamide-9T and polyamide-10T and polyamide-12T;
- copolyamides of one or more of polyamide-4T, polyamide-5T, polyamide-6T, polyamide-7T, polyamide-8T, polyamide-9T and polyamide-10T and polyamide-12T and one or more of polyamide-6, polyamide-46, polyamide-56, polyamide-66, polyamide-410, polyamide-510, polyamide-610, and polyamide-61. Preferably, the aliphatic polyamide is polyamide-46 or a copolyamide thereof. Preferably, the semi-aromatic polyamide is a copolyamide of polyamide-XT and another polyamide, wherein XT is 4T, 5T or 6T, and more preferably PA-6T/4T or PA-6T/5T, or a tercopolymer thereof with another polyamide. Examples thereof include PA-4T/6T/66, PA-5T/6T/66 and PA-6T/61/66.

In one preferred embodiment, the base polymer could be ForTii MX3. Preferably, the plastic material in the shell roller part is a non-reinforced polyamide-46 composition.

Preferably, the plastic material in the core roller part, or in the shell roller part, or in both, comprises 30-70 wt. % glass fiber and 70-30 wt. % base polymer relative to the total weight of the plastic material.

Preferably, the plastic material comprises less than 70 wt. % of glass fiber, preferably, less than 50 wt. %, more preferably less than 40 wt. %, most preferably 30 wt. %, relative to the total weight of the plastic material.

The roller parts according to the present invention may be prepared for example by means of injection-molding.

The present invention also relates to a chain unit comprising the inventive rollers as described above, comprising inner plates, outer plates, bushing press-fitted into the inner plates, pins press-fitted into the outer plates and passed through the bushings and rollers; wherein the rollers are located between the inner plates and through which the bushings are passed.

The present invention also relates to also relates to a chain comprising the chain unit as disclosed in present application.

Throughout the description and claims of this specification, the words "comprise" and "contain" and variations of the words, for example "comprising" and "comprises", means "including but not limited to", and is not intended to (and does not) exclude other moieties, additives, components, integers or steps.

The use of the core-shell roller according to the invention reduces the shrinkage problems compared to massive rollers. Due to uniform force and friction distributions over the outer surface of the core shell roller, compared to other roller constructions, the wear of the roller is also reduced.

In addition, the two parts can be manufactured in two separate molding tools as well as in one single molding tool. The assembly requires only a manual press.

Because the roller is constructed of two parts, it is possible to use different materials for shell roller part (low wear and friction) and core roller part (high strength and stiffness). In addition, the cylindrical wall thicknesses of the obtained roller have doubled.

Another advantage is that the shell roller part can be sacrificial and replaced.

FIGURE DESCRIPTION

FIG. 1 is the schematic representation of the roller for a chain as according to the present invention. 1 represents the shell roller part; 2 represents the first outer cylinder; 3 represents the first inner cylinder; 4 represents the bottom of the shell roller part; 5 represents the core roller part; 6 represents the second outer cylinder; 7 represents the second inner cylinder; 8 represents the top of the core roller part; 9 represents the gap which can receive the snap; 10 represent the snap.

The roller for a chain according to the present invention is constructed by assembling a shell roller part 1 and a core roller part 5. The shell roller part 1 comprises a first outer cylinder 2, a first inner cylinder 3 which is positioned concentrically inside the first outer cylinder 2. A bottom 4 which is positioned at and connected to one end of the first inner cylinder 3 and the first outer cylinder 2; wherein the bottom 4 is stretched from the first inner cylinder 3 to the first outer cylinder 2 and a container is surrounded by the first inner cylinder 3, the first outer cylinder 2 and the bottom 4.

The core roller part 5 comprises a second inner cylinder 7, a second outer cylinder 6, a top 8 which is positioned at one end of the second inner cylinder 7 and the second outer cylinder 6, and ribs 11 (refer to FIG. 2) which are radially even-distributed in the space between the second inner cylinder 7 and the second outer cylinder 6 and extend from the second inner cylinder 7 to the second outer cylinder 6; wherein the top 8 is positioned at and connected to one end of the second inner cylinder 7 and the second outer cylinder 6. The top 8 is stretched from the second inner cylinder 7 to the second outer cylinder 6. The core roller part 5 is positioned concentrically in the space surrounded by the first inner cylinder 3, the first outer cylinder 2 and the bottom 4.

When the core roller part 5 is being pressed into the shell roller part 1, the snap 10 elastically deform until the core roller part 5 is in final position, at this moment, the gap 9 allow them to 'snap back' to their original shape.

Other than the roller according to the present invention, the chain unit comprises inner plates, outer plates, bushing press-fitted into the inner plates, pins press-fitted into the outer plates and passed through the bushings and rollers and the rollers are located between the inner plates and through which the bushings are passed.

EMBODIMENTS

1. Manufacture of a Roller

Figure 1:
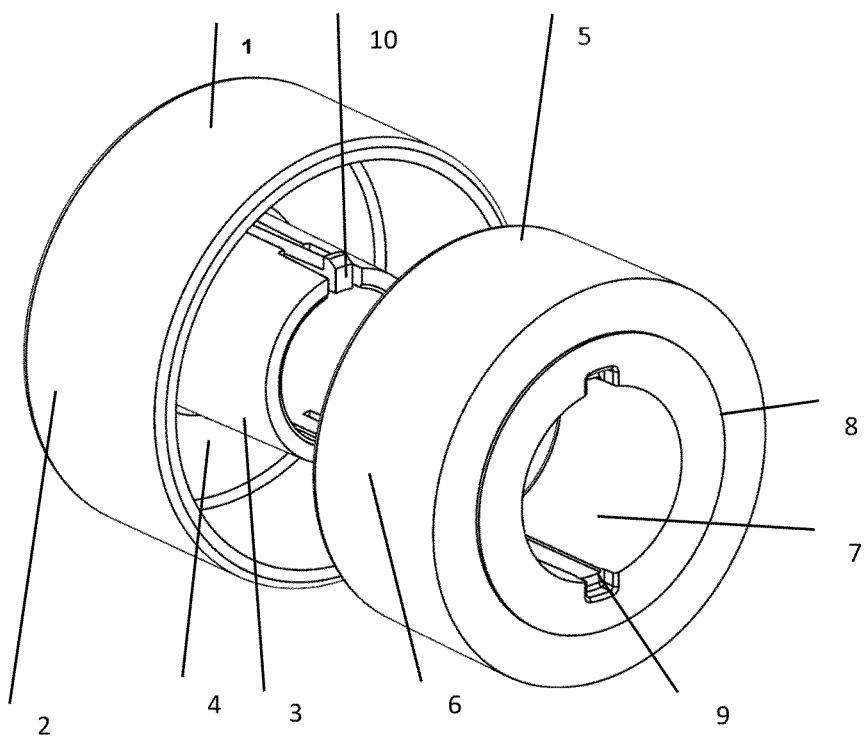
Figure 2:
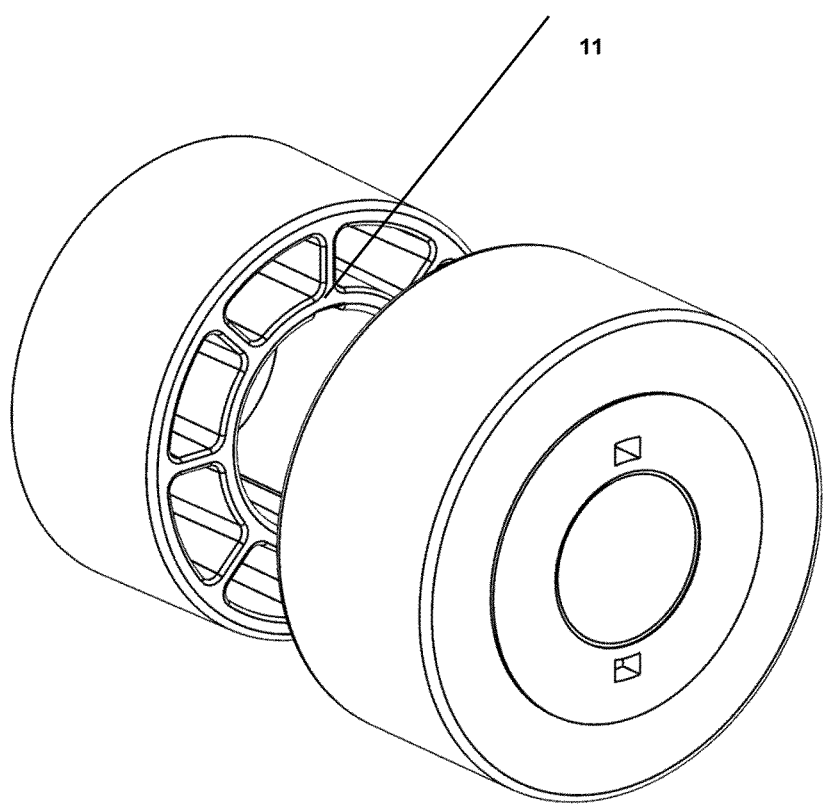
FIG. 2 is a schematic representation of the core half with ribs. 11 represents the ribs which is stretched from the inner cylinder to the outer cylinder of the core roller part.

A shell roller part and a core roller part were prepared separately from an injection molding compound of (a ForTii MX3 grade of DSM comprising 50 wt. % of glass fiber, via an injection molding process. The two parts were assembled into roller as shown in FIG. 1.

2. Assemble of a Chain

Figure 3:
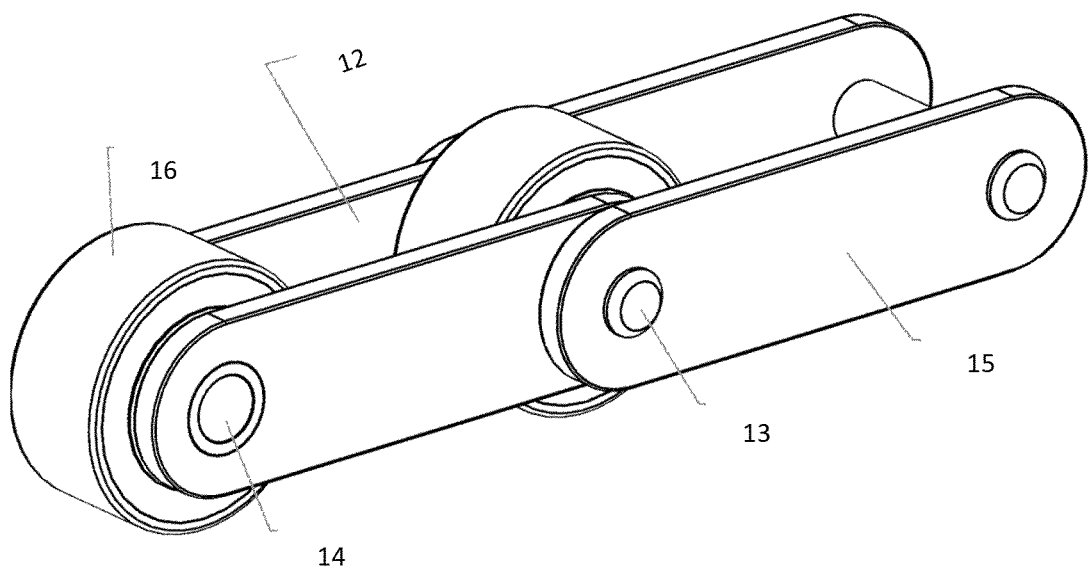
FIG. 3 is a schematic representation of a chain unit. 12 represents an inner plate, 13 represents a pin, 14 represents a bushing, 15 represents an outer plate; 16 represents a roller.

An inner chain unit as shown in FIG. 3 was formed by connecting two inner plates through bushing which match with the pin. Rollers were mounted on the bushings. An outer chain unit was formed by connecting two outer plates through the pin. A roller chain was formed by combining inner chain unit and outer chain units through a series connection by passing the pins through the bushings.

The invention claimed is:

1. A roller for a chain which is constructed by a shell roller part and a core roller part, wherein the shell roller part comprises a first outer cylinder, a first inner cylinder which is positioned concentrically inside the first outer cylinder, and a bottom which is positioned at and connected to one end of the first inner cylinder and the first outer cylinder; and wherein the bottom is stretched from the first inner cylinder to the first outer cylinder;

wherein the core roller part comprises a second outer cylinder, a second inner cylinder which is positioned concentrically inside the second outer cylinder, and a top which is positioned at and connected to one end of the second inner cylinder and the second outer cylinder; and wherein the top is stretched from the second inner cylinder to the second outer cylinder;

wherein the core roller part is positioned concentrically in the space surrounded by the first inner cylinder, the first outer cylinder and the bottom.

2. The roller according to claim 1, wherein the top and the bottom are positioned at opposite sides of the roller.

3. The roller according to claim 1, wherein the core roller part further comprises ribs which are radially evenly distributed in the space between the second inner cylinder and the second outer cylinder and extend from the second inner cylinder to the second outer cylinder.

4. The roller according to claim 1, wherein the shell roller part comprises a snap device and the core roller part comprises a corresponding gap for receiving the snap device.

5. The roller according to claim 1, wherein the core roller part comprises a snap device and the shell roller part comprises a corresponding gap for receiving the snap device.

6. The roller according to claim 1, wherein the core roller part has 6 to 12 ribs, preferably 8 ribs.

7. The roller according to claim 1, wherein both the shell roller part and the core roller part are made of a plastic material.

8. The roller according to claim 7, wherein the shell roller part and the core roller part are made of the same plastic material.

9. The roller according to claim 7, wherein the shell roller part and the core roller part are made of different plastic materials.

10. The roller according to claim 7, wherein the plastic material comprises a base polymer selected from the group consisting of polyamides, polyesters, polyphenylene sulfides (PPS) and/or polyphenylene-ethers (PPE).

11. The roller according to claim 7, wherein the plastic material in the core roller part, or in the shell roller part, or in both, comprises 30-70 wt. % glass fiber and 70-30 wt. % base polymer relative to the total weight of the plastic material.

12. The roller according to claim 7, wherein the plastic material in the shell roller part is a non-reinforced polyamide-46 composition.

13. A chain unit comprising the roller according to claim 1, comprising inner plates, outer plates, bushings press-fitted into the inner plates, pins press-fitted into the outer plates and passed through the bushings and rollers; wherein the rollers are located between the inner plates and through which the bushings are passed.

14. A chain comprising a chain unit according to claim 13.

* * * * *